United States Patent
Ahn et al.

(10) Patent No.: US 6,881,514 B2
(45) Date of Patent: Apr. 19, 2005

(54) STACKED ELECTROCHEMICAL CELL (75) Inventors: Soon-Ho Ahn, Taejeon (KR);
Hyang-Mok Lee, Taejeon (KR);
Seung-Jin Lee, Taejeon (KR);
Tae-Hyung Kim, Teajeon (KR);
Hyung-Keun Lee, Taejeon (KR)

(73) Assignee: LG Chemical Co., Ltd., Seoul (KR)

( * ) Notice: Subject to any disclaimer, the term of this patent is extended or adjusted under 35 U.S.C. 154(b) by 88 days.

(21) Appl. No.: 09/958,267

(22) PCT Filed: Feb. 8, 2001

(86) PCT No.: PCT/KR01/00188

§ 371 (c)(1),
(2), (4) Date: Oct. 5, 2001

(87) PCT Pub. No.: WO01/59869

PCT Pub. Date: Aug. 16, 2001

(65) Prior Publication Data

US 2003/0013012 A1 Jan. 16, 2003

(30) Foreign Application Priority Data

Feb. 8, 2000 (KR) .......................................... 2000-5848
Feb. 7, 2001 (KR) .......................................... 2001-5860

(51) Int. Cl.$^7$ ............................................... H01M 2/10
(52) U.S. Cl. .................... 429/99; 429/123; 429/129; 429/149; 429/152; 429/156; 429/157; 429/158; 429/160; 429/162; 429/231.9; 429/231.95; 429/32
(58) Field of Search .................... 429/32, 99, 123, 429/129, 149, 152, 156, 157, 158, 160, 162, 231.9, 231.95, 135, 137, 145

(56) References Cited

U.S. PATENT DOCUMENTS

| 2,798,895 | A |   | 7/1957  | Nowotny ..................... 136/111 |
|-----------|---|---|---------|--------------------------------------|
| 4,981,672 | A | * | 1/1991  | de Neufville et al. ...... 423/464    |
| 5,300,373 | A |   | 4/1994  | Shackle ...................... 429/152 |
| 5,395,503 | A | * | 3/1995  | Parce et al. ............. 204/403.1  |
| 5,498,489 | A |   | 3/1996  | Dasgupta et al. ........... 424/152   |
| 5,552,239 | A |   | 9/1996  | Gozdz et al. ................ 429/94  |
| 5,571,634 | A |   | 11/1996 | Gozdz et al. ............... 429/192  |
| 5,580,676 | A |   | 12/1996 | Honda et al. ............... 429/131  |
| 5,741,608 | A | * | 4/1998  | Kojima et al. ................ 429/94 |
| 5,902,697 | A |   | 5/1999  | Guindy et al. .............. 429/153  |
| 6,103,413 | A | * | 8/2000  | Hinton et al. ................. 429/32 |
| 6,136,471 | A | * | 10/2000 | Yoshida et al. .......... 429/218.1   |
| 6,432,586 | B1| * | 8/2002  | Zhang ........................ 429/251 |

FOREIGN PATENT DOCUMENTS

| JP | 09-092337   | 4/1997 |
|----|-------------|--------|
| KR | 2001-0055968| 7/2001 |
| WO | 99/33135    | 7/1999 |

* cited by examiner

Primary Examiner—Bruce F. Bell
(74) Attorney, Agent, or Firm—Ladas & Parry LLP (57) ABSTRACT

An electrochemical element with improved energy density is provided. The electrochemical element has electrochemical cells which are multiply stacked. The electrochemical cell is stacked with the full cell or bicell as a basic unit and a separator film is interposed between the adjoining portion of the cells. The electrochemical element is easy to manufacture, has a structure which uses the space available efficiently, and can maximize the content of the active electrode material so that a highly integrated battery can be implemented.

8 Claims, 6 Drawing Sheets

STACKED ELECTROCHEMICAL CELL

BACKGROUND OF THE INVENTION (a) Field of the Invention

The present invention relates to an electrochemical element, specifically an electrochemical element with improved energy density comprising multiply stacked electrochemical cells.

(b) Description of the Related Art

There has been growing interest on energy storage technology. The applicable field of the battery has been expanded to cellular phones, camcorders and notebook computers with recent addition of electric vehicles into this list. Such expansion has led to increased research and development of batteries with visible outcomes. In this respect, researches on electrochemical elements are one of the fields that have been receiving much attention, among which rechargeable battery is the central field of interest. Recent developments have turned its way to designing new batteries and electrodes to improve capacity and specific energy.

Among the secondary batteries being used, lithium ion battery developed in the 1990s has become increasingly popular because it has higher operating voltage and energy density compared to Ni-MH, Ni—Cd, and sulfuric acid-lead batteries that use aqueous solution electrolyte. These lithium ion batteries, however, have safety problems resulting from the use of organic electrolyte, which causes the batteries to be flammable and explosive. Also, lithium ion has the weakness of having difficult manufacturing process. Recent lithium ion polymer batteries have overcome such shortcomings of the lithium ion batteries and are anticipated to become the batteries of the next generation. These lithium ion polymer batteries, however, have relatively low capacity compared to lithium ion batteries and have especially insufficient discharging capacity at low temperatures; and thus, need to be improved.

The capacity of the batteries is in proportion to the amount of the electrode active materials. Thus, it is extremely important to design a cell structure that can be filled with as much quantities of electrode materials as possible within the limited space of the battery package. The most widely known and used type of cell structure is a jellyroll shaped structure used in a cylindrical or a prismatic battery. Such a structure is prepared by a process of coating and pressing active electrode material onto a metal foil which is used as a current collector, followed by cutting it into a shape of a strip having predetermined width and length, and then separating the anode and cathode using the separator film, and then winding it into a spiral form. Such a jellyroll structure is widely used for manufacturing cylindrical batteries. This structure, however, has small radius of curvature at the center portion of the spiral, which often results in extreme stresses at the bending surface of the electrode, often causing exfoliation of the electrode. This facilitates the deposition of lithium metal at the center portion of the electrode during the repeated charge and discharge of the battery, which may shorten the lifespan of the battery while degrading the safety of the battery.

Generally, the widely known and used method of manufacturing a thin prismatic shaped battery comprises aforesaid process of winding the spiral shaped jelly roll into an oval shape and then compressing it, followed by inserting it into a rectangular container. This method is not free from aforesaid problems of reduced lifespan and safety, but rather has increased problems caused by the decrease in the radius of curvature due to the oval shape. Also, the problem of reduced performance is greater because manufacturing a tight spiral structure is inherently impossible. Furthermore, discrepancy of the oval shape of the jelly role and the rectangular shape of the container reduces the rate of utilized volume. This is known to reduce approximately 20% of the weight energy density and 25% of the volume energy density when the container is taken into account. In reality, a prismatic lithium ion battery is reported to have lower capacity density and specific energy compared to a cylindrical one.

Recently, various patents and technologies proposing to solve the problems of the spiral jelly roll type structure and providing cell structures suitable for a prismatic container are being published. These proposals, however, only provides partial solution to the problems or causes other problems more difficult to solve so that they have not become a practical solution. For example, U.S. Pat. No. 5,552,239 describes a process of first placing and laminating a separator layer or polymer electrolyte between the cathode and anode, then cutting it into a form of a strip with predetermined length and width, followed by gradually folding a cell having an anode/separator layer/cathode layered structure into a square form. The inventors of the present invention have tried to replicate such a process but have found out that it was difficult to manufacture the cells for such a use. The laminated cells were so stiff that it was difficult to fold and when it was folded by exerting force, the problem arose in the folded area because it was fractured in a manner similar to the jellyroll typed cells.

In fan-folding method described in U.S. Pat. No. 5,300,373, the pressure and stresses at the inner layer of the abruptly bending portion are transferred to the outer layer and diverged so that twisting and stretching occur, finally resulting in a "dog bone" shaped cell. Thus, the problems of exfoliations, cracks, crumbles or snapping, encountered in jelly role type structure also occur frequently. Also, the cells with this structure are inherently prone to snapping; and therefore, the possibility of making a practically applicable battery is very low.

Meanwhile, U.S. Pat. No. 5,498,489 attempted to solve and improve such problems in the bending portions. It provides a fundamental way of avoiding exfoliation of the electrodes by leaving out the electrodes at the folding portions and providing connections only through the use of current collectors and separator layers or polymer electrolyte portions. But, there is difficulty in composing such a cell. Furthermore, too much current collectors are used and the structure wastes too much electrolyte. Thus, the structure is not very practical because it has many inefficient factors.

SUMMARY OF THE INVENTION

It is an objective of the present invention to provide an electrochemical element comprising electrochemical cells which are multiply stacked, wherein it is easy to manufacture, and has a structure making efficient use of the space available while considering the prior art.

It is another objective of the present invention to provide an electrochemical element that can maximize the content of the active electrode material.

These objects may be achieved by an electrochemical element comprising electrochemical cells which are multiply stacked, wherein; a) said electrochemical cells are formed by stacking full cells having a cathode, a separator layer, and an anode sequentially as a basic unit; and b) a separator film is interposed between each stacked full cell of a).

Also, above objectives and others may be achieved by an electrochemical element comprising electrochemical cells which are multiply stacked, wherein; a) said electrochemical cells are formed by stacking: i) a bicell having a cathode; a separator layer; an anode; another separator layer; and another cathode sequentially as a basic unit; or ii) a bicell having an anode; a separator layer; a cathode; another separator layer; and another anode sequentially as a basic unit; and b) a separator film is interposed between each stacked bicells of a).

DETAILED DESCRIPTION OF THE PREFERRED EMBODIMENTS

Hereinafter, the present invention will be discussed in detail with reference to the figures.

[Function]

The present invention provides a cell structure and a method for the preparation thereof that is more convenient to manufacture and uses space more efficiently compared to conventional cells. The present invention provides a unique but a simple way of maximizing the content of electrode active material in a prismatic battery while solving various shortcomings of various conventional cell structures discussed above. In principle, the present invention does not make avail of longitudinally cut electrodes used for spiral winding or folding, but rather uses the method of stacking electrodes cut in a predetermined form.

Figure 1A:
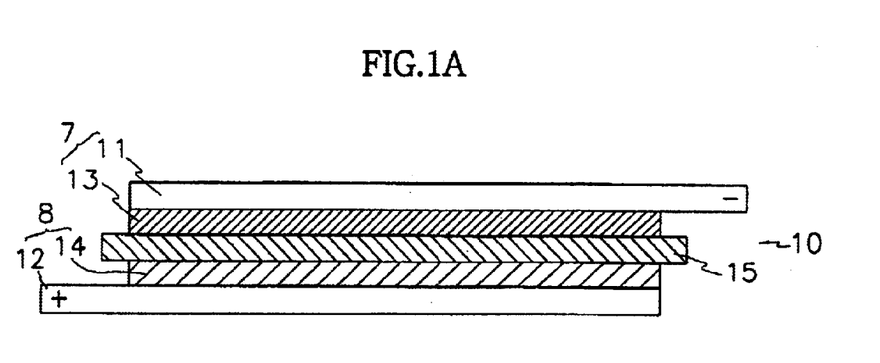
FIG. 1a shows a layered structure of a full cell comprising a single-side coated cathode, an anode and a separator layer.

The most typical cell structure is illustrated in FIG. 1a wherein layered structure of a cathode, an anode and a separator layer is cut into a regular shape and size, and then stacked to form a full cell 10. In the present invention, the full cell 10 of such a structure is treated as a unit cell which constitutes a battery. For example, in a lithium rechargeable cell, the main component of the cathodic material 14 is lithium intercalation materials such as lithium manganese oxide, lithium cobalt oxide, lithium nickel oxide or a complex oxide formed from a combination of aforesaid oxides, said cathodic material bonded to the cathode current collector 12, that is, a foil prepared from aluminum, nickel, or a combination thereof to form a cathode 8. Also the main component of the anodic material 13 is lithium metal or lithium alloy, and lithium intercalation materials such as carbon, petroleum coke, activated carbon, graphite or other carbons, said anode material 13 bonded to anode current collector 11, that is a foil prepared from copper, gold, nickel, copper alloy or a combination thereof to form an anode 7.

The separator layer 15 includes a micro-porous polyethylene film, a micro-porous polypropylene film, or a multi-layer film prepared by a combination thereof, or a polymer film for solid polymer electrolyte or gel-type polymer electrolyte such as polyvinylidene fluoride, polyethylene oxide, polyacrylonitrile or polyvinylidene fluoride hexafluoropropylene copolymer. Furthermore, it is very efficient to use a polymer film for polymer electrolyte including a primary micro-porous polymer layer and a secondary gelling polymer layer of polyvinylidene fluoride-chlorotrifluoroethylene copolymer described in Korean Patent Application No. 99-57312.

The unit structure of the full cell 10 shown in FIG. 1a is composed of a cathode 8, a separator layer 15, and an anode 7 sequentially. The separator layer 15 is naturally located at the center of the cell. A plurality of theses unit cells can be stacked as shown in FIG. 1b to prepare a battery with practical capacity.

Figure 1B:
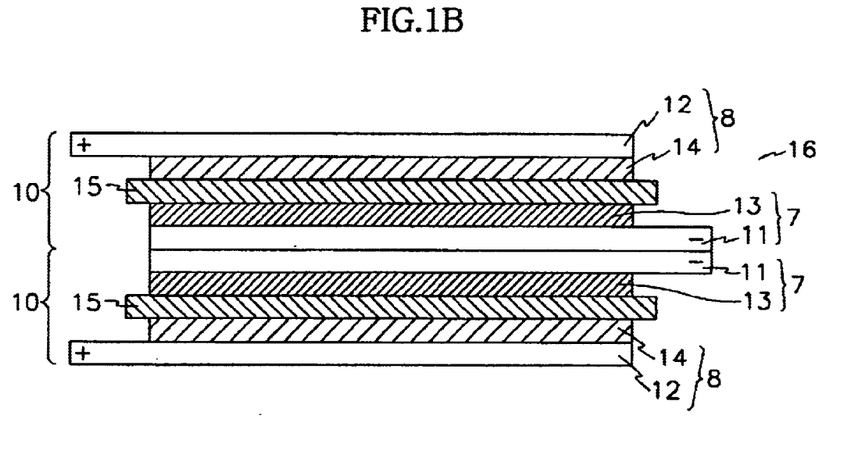
FIG. 1b shows a layered structure of a cell where two full cells are stacked.

The stacked cell 16 shown in FIG. 1b has only two unit cells stacked as (10)/(10). But, as many cells as desired can be stacked. The number of unit cells to be stacked is designed and determined according to the desired capacity of the battery. In a stacked cell 16 structure, the electrodes inevitably overlap between the unit cells. If many units of cells are stacked, the number of overlapping electrodes will also increase. As a result, the space utilization will decrease. Coating and using only a single side of the current collector during the preparation of the electrodes cause such a problem.

The present invention provides a way to make more efficient use of the space when multiple unit cells are overlapped, that is, it seeks to avoid overlapping current collector plate by using the structure coated with identical active material on the both sides of the current collector. If a full cell is prepared using an electrode coated with electrode materials on both sides, a new unit cell having such a structure as the full cell 17 of FIG. 2a comes to existence.

Figure 2A:
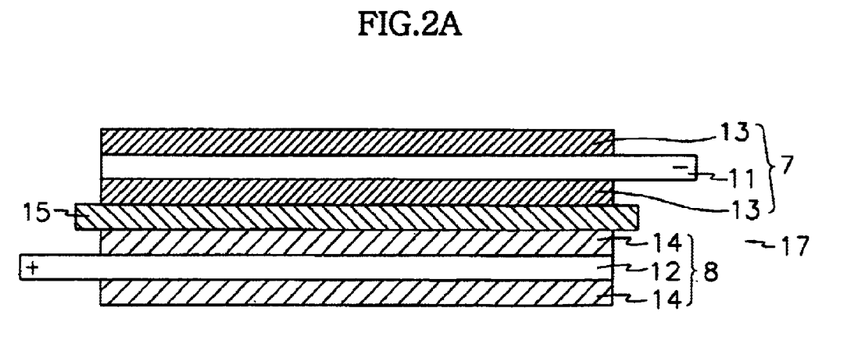
FIG. 2a shows a layered structure of a full cell comprising a both-side coated cathode, an anode and a separator layer.
Figure 2B:
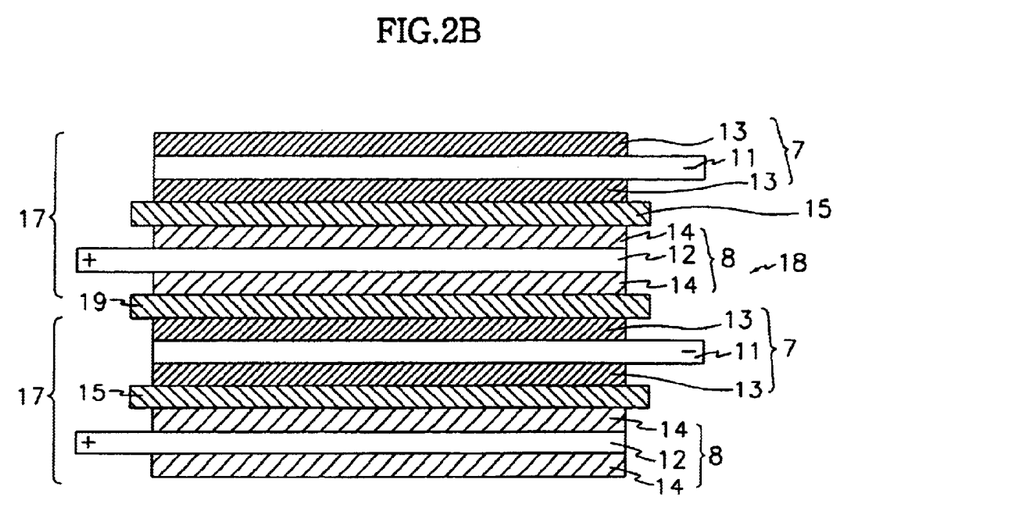
FIG. 2b shows a layered structure of a cell where two full cells are stacked.

A stacked cell 18 as in FIG. 2b is prepared by stacking two full cells 17 as a unit cell and inserting a polymer separator layer such as aforesaid separator layer 15 or a separator film 19 such as a polymer film for polymer electrolyte. Such a structure becomes a very efficient structure because the outer active coating material not used within a unit cell is shared with opposite electrode active coating material of another adjacent unit cell, forming another new full cell. This structure becomes more effective as more unit cells are stacked. The electrode materials of the outermost anodic material 13 and cathodic material 14 of the stacked cell 18, however, are not shared or used because the current collectors are used as foils. The proportion taken up by the unused portions decreases as the stacks increase. Because the number of stacks is large considering the thickness of the unit cell and the thickness of the battery that is practically used, such a cell structure is sufficiently effective.

Figure 3:
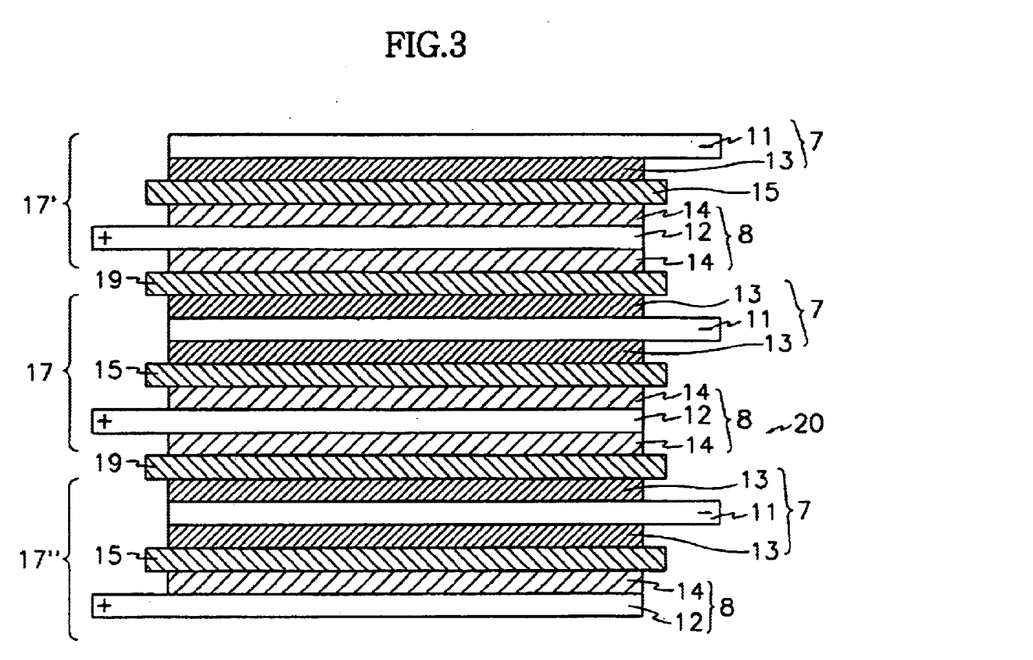
FIG. 3 shows a layered structure of a stacked cell where a full cell is a unit cell.

A triple cell 20 of FIG. 3 shows the most effective structure considering all the above factors while having the full cell as a basic unit cell. This shows the minimum number of stacked unit cells. By adopting a full cell 17' structure one of whose electrode is coated on both sides and the other electrode coated on a single side, while having a stacked cell 17 placed in the center, a new stacked cell 20 has a structure of 17'/17/17'. Thus, the unused portion of the outer active electrode material appearing in the stacked cell 18 is left as the foils. To achieve capacity for a practical use, a plurality of layers will be stacked as (17')/(17)/(17) . . . (17)/(17'), and as the stacks increase, this will not be much different in terms of space utilization efficiency from the stacked cell 18 which has a structure of (17)/(17)/(17) . . . (17)/(17). The stacked cell 20 structure, however, may be very effective for a thin layer card typed battery.

Figure 4A:
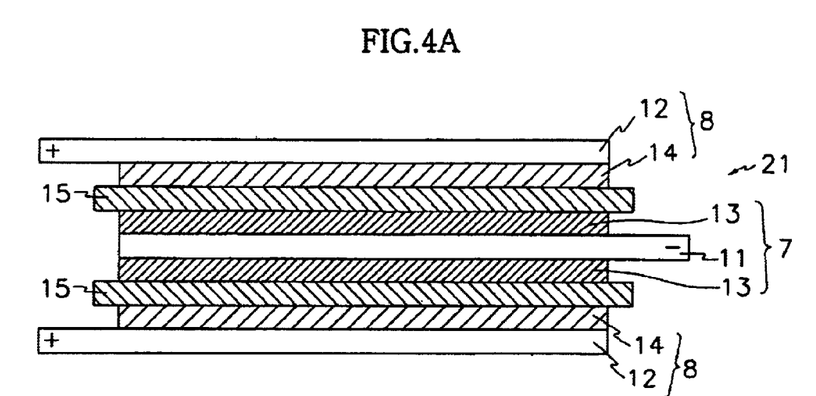
FIG. 4a shows a layered structure of a bicell comprising a partially single-side coated electrode, a both-side coated electrode and a separator layer.

The overlapping middle electrode plate of the stacked cell 16 structure shown in FIG. 1b reduces the efficiency of the cell as discussed above. Therefore, the efficient structure unifying the overlapping electrodes between the cells itself can be treated as a new unit cell. The cell 21 shown in FIG. 4a shows such a new unit cell which is a bicell structure having a polarity at the middle and an opposite polarity at both sides.

Figure 4B:
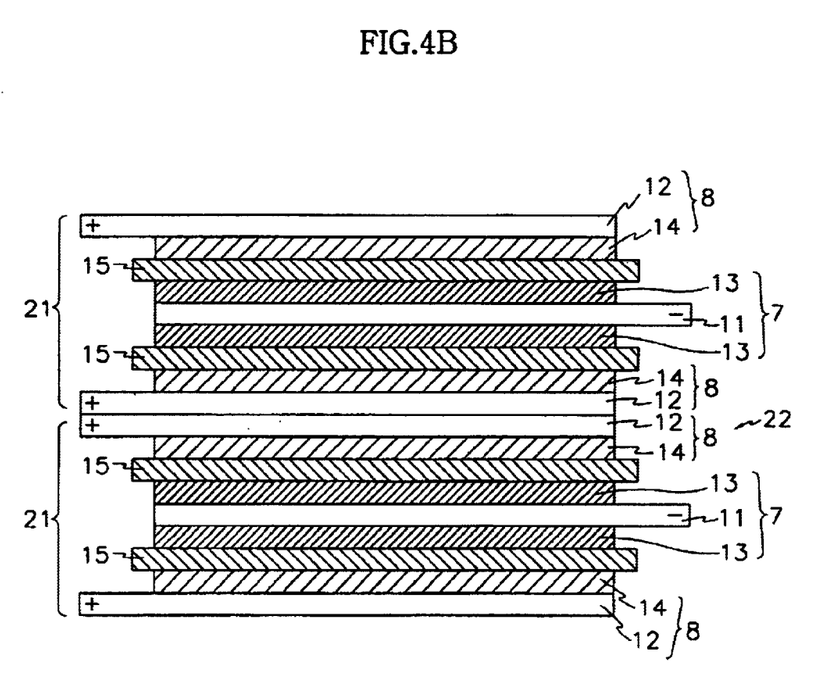
FIG. 4b shows a layered structure of a cell where two bicells are stacked.

A cell having high space utilization can be made by stacking such bicell units as (21)/(21) structure shown in the stacked bicell 22 of FIG. 4b. Alternatively, more layers of such units can be stacked to form a battery. In this embodiment, however, overlapping electrodes between the bicells also appear as in the case of the stacking cell 16 of FIG. 1b where full cells 10 of FIG. 1a were stacked. The details are same as ones shown in a stacking cell 16 structure, and the cause also lies in the structural problem, that is, the anode is coated on both sides but the cathode is coated on a single side as can be seen in the bicell 21 of FIG. 4a. Though the overlapping of the stacked cell 22 of FIG. 4b is less frequent compared to the stacked cell 16 of FIG. 1b, the space utilization is nevertheless reduced.

Figure 5A:
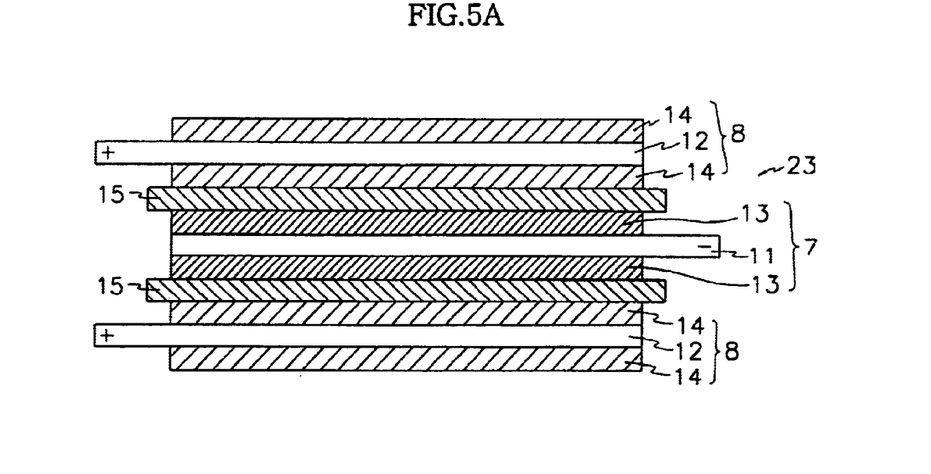
FIG. 5a shows a layered structure of a bicell where an anode is a middle layer and both outer portions are cathodes.
Figure 5B:
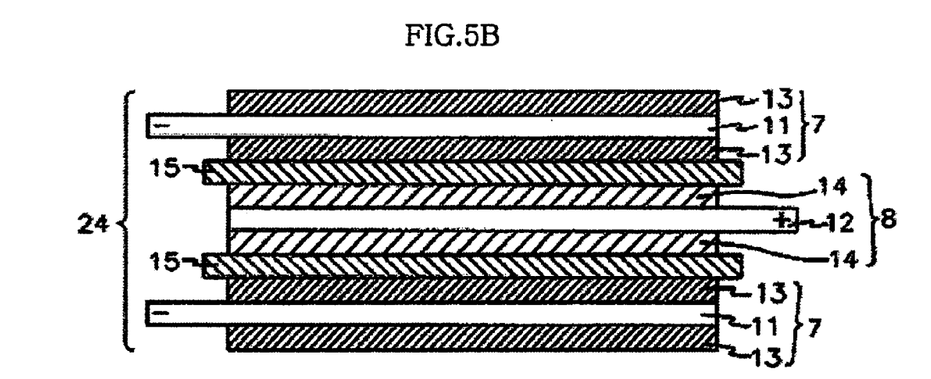
FIG. 5b shows a layered structure of the bicell where a cathode is a middle layer and both outer portions are anodes.

The present invention provides a way to use the cell structure in a more space-efficient manner compared to the case where a bicell is used as a unit cell to be multiply stacked. That is, the present invention provides a method of avoiding the overlapping of the current collectors by using the current collector coated with identical active material coated on the opposite side. To such an end, two types of bicells 23, 24 are defined, which use electrodes with both sides coated as shown in FIGS. 5a and 5b. The bicell 23 in FIG. 5a places the anode at the center and the cathodes at the outer sides whereas the bicell 24 of FIG. 5b places the cathode at the center and the anodes at the outer sides.

Figure 6:
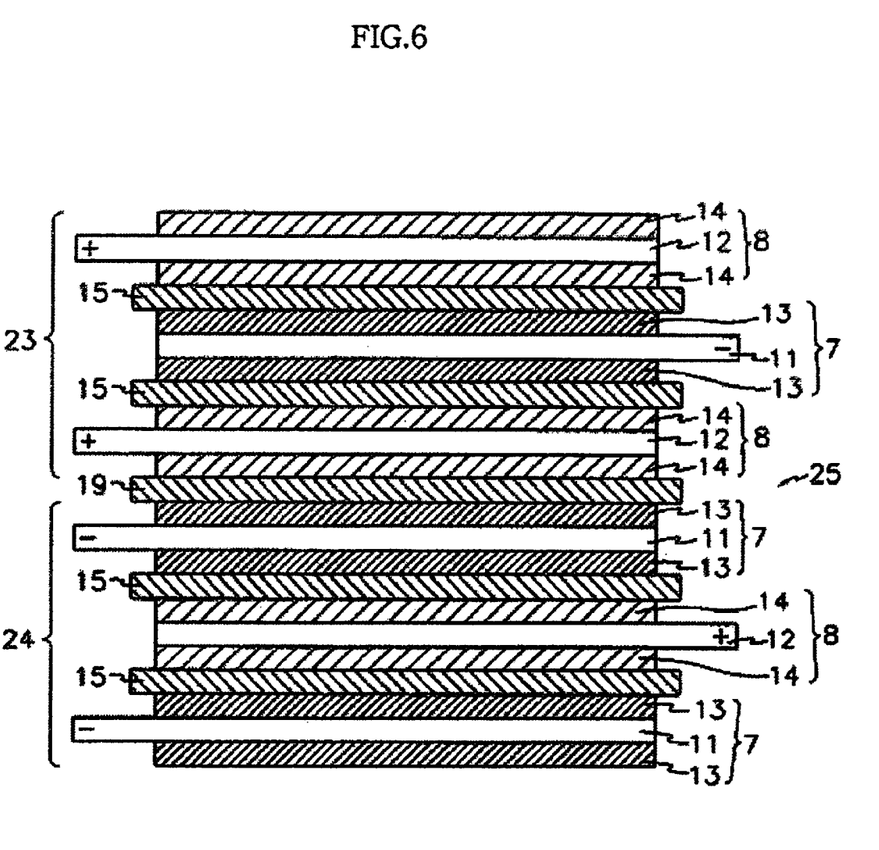
FIG. 6 shows a layered structure of a stacked cell where two types of bicells are respectively unit cells.

When the bicells are stacked as in (23)/(24) structure as in stacked cell 25 of FIG. 6 and aforementioned polymer separator layer such as separator layer 15 or separator film 19 such as polymer film for polymer electrolyte are inserted between the bicells, the outer active coating material not used within a bicell is naturally shared with an opposite polarity of another type of adjacent bicell, forming a new full cell which is a very efficient structure. Such cell can also be stacked into a multiple layer. In this case, if the separator films 19 are interposed between the cells and the bicells are alternately stacked as in (23)/(24)/(23)/(24)/ . . . (23)/(24)/(23), the polarity of the battery is naturally formed without discrepancy. The outermost-stacked bicell of the battery can be either bicell 23 or bicell 24, the only difference being whether the unused electrode material is an anode or a cathode. The proportion of such unused electrodes decreases as the number of stacks increases and it has little influence for electrode with a practical thickness.

Figure 7:
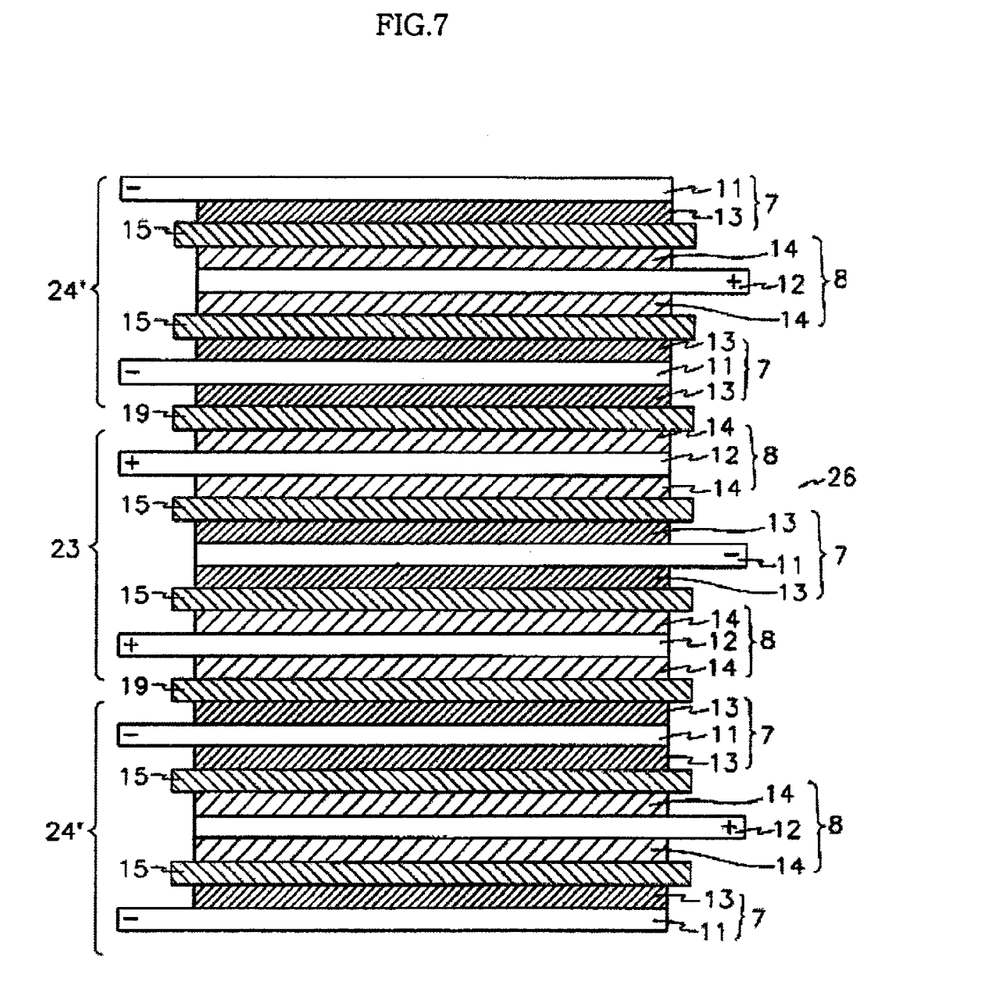
FIG. 7 shows a layered structure of the cell composed of alternately stacking bicells comprising partially single-side coated electrodes and a separator layer, and bicells comprising both-side coated electrodes and a separator layer.

FIG. 7 shows a stacked cell 26 where the bicell is a basic unit and all the above factors are considered to make an efficient structure. In this drawing, only three stacked bicells are shown. When the primes(') denote structures where only one out of two outer electrodes of the bicell is left as the foil, there is no portion of active electrode material that is not used when the bicells are stacked to a form of (24')/(23)/(24') as shown in stacked cell 26 of FIG. 7. Variations in structure such as (23')/(24)/(23'), along with other combinations are also possible. As explained above, when the bicells are stacked in multiple layers as (24')/(23)/(24)/(23) . . . /(24)/(23)/(24'), there will be less difference in space utilization efficiency compared to (24)/(23)/(24)/(23) . . . /(24)/(23)/(24) shown in the stacked cell 25 of FIG. 6 as layers increase. In a thin layer card typed battery, however, the structure of stacked cell 26 of FIG. 7 is effective.

The battery structure provided in the present invention is very effective for a prismatic battery. Generally, liquid electrolyte is injected during packaging. For such a purpose, aluminum prismatic can or an aluminum-laminated film can be used as a container. Unlike a jelly roll of a lithium ion battery, the constituents of the battery according to the present invention have a form coinciding with the form of the quadrilateral container so that there will be no unused space within the container. Therefore, the energy density of the battery can be greatly increased to implement a highly integrated battery having maximized space efficiency of active materials.

The electrochemical element of the present invention can be applied to the various fields such as supercapacitors, ultracapacitors, primary batteries, secondary batteries, fuel cells, sensors, electrolysis devices, electrochemical reactors, and etc, besides lithium secondary batteries.

The present invention will be explained in detail with reference to the examples. These examples, however, should not in any sense be interpreted as limiting the scope of the present invention.

EXAMPLES

Example 1

Preparing a Stacked Cell where a Full Cell is a Basic Unit (Preparing a Cathode)

$LiCoO_2$:carbon black:PVDF, of which the weight ratio was 95:2.5:2.5, was dispersed in NMP in order to prepare slurry, and then the slurry was coated on an aluminum foil. After sufficiently drying at 130° C., the cathode was prepared by pressing.

A cathode that was to be placed in the outermost side of the outermost full cell was prepared by coating the slurry on a single side of aluminum foils. That is, the cathode has a cathodic material coated on a single side of the aluminum cathode current collector. A cathode of the full cell that was to be placed in the inner side was prepared by coating the slurry on both sides of aluminum foil. In this case, the cathode has a cathodic material coated on both sides of the aluminum cathode current collector. The thickness of the single-side coated cathode was 105 $\mu$m and the thickness of the both-side coated cathode was 140 $\mu$m.

(Preparing an Anode)

Graphite:acetylene black:PVDF, of which the weight ratio was 93:1:6, was dispersed in NMP in order to prepare slurry, and then the slurry was coated on a copper foil. After sufficiently drying at 130° C., the anode was prepared by pressing.

An anode that was to be placed in the outermost sides of the outermost full cell was prepared by coating the slurry on a single side of copper foils. That is, the anode has an anodic material coated on a single side of the copper anode current collector. An anode of the full cell that was to be placed in the inner side was prepared by coating the slurry on both sides of copper anode current collector. In this case, the anode has an anodic material coated on both sides of the copper anode current collector. The thickness of the single-side coated anode was 100 µm and the thickness of the both-side coated anode was 135 µm.

(Preparing a Separator Layer; a Separator Film; a Polymer Film for Polymer Electrolyte)

A multi-layer polymer film was prepared wherein polypropylene film having a microporous structure and a thickness of 16 µm was a first polymer separator layer and polyvinylidene fluoride-chlorotrifluoroethylene copolymer 32008(Solvay) was a secondary gelling polymer. 6 g of the 32008 was added to 194 g of acetone and stirred at 50° C. After 1 hour, the completely dissolved transparent 32008 solution was coated on the first polymer separator layer of polypropylene by a dip coating process. The thickness of coated 32008 was 1 µm and the thickness of the final multi-layered polymer film was 18 µm.

(Preparing a Full Cell to be Placed in the Inner Side)

The full cell 17 of FIG. 2a was prepared by, cutting the cathode having cathodic material coated on both sides of the cathode current collector to the size of 2.9 cm×4.3 cm of rectangle, except for the area where a tab was to be formed, cutting the anode having anodic material coated on both sides of the anode current collector to the size of 3.0 cm×4.4 cm of rectangle, except the area where a tab was to be formed, cutting a multi-layered polymer film prepared in a manner mentioned above the size of 3.1 cm×4.5 cm, interposing the above film between the anode and the cathode, and passing it through a roll laminator of 100° C. to laminate each electrodes and the separator layer.

(Preparing a Full Cell to be Placed in the Outermost Side)

The full cell 17' of FIG. 3 was prepared by cutting the cathode having cathodic material coated on single side of the cathode current collector to the size of 2.9 cm×4.3 cm of rectangle, except for the area where a tab was to be formed, cutting the anode having anodic material coated on both sides of the anode current collector to the size of 3.0 cm×4.4 cm of rectangle, except the area where a tab was to be formed, cutting a multi-layered polymer film prepared in a manner mentioned above to the size of 3.1 cm×4.5 cm, interposing the above film between the anode and the cathode, and passing it through a roll laminator of 100° C. to laminate each electrodes and the separator layer.

Also, the full cell 17" of FIG. 3 was prepared by cutting the cathode having cathodic material coated on both sides of the cathode current collector to the size of 2.9 cm×4.3 cm of rectangle, except for the area where a tab was to be formed, cutting the anode having anodic material coated on single side of the anode current collector to the size of 3.0 cm×4.4 cm of rectangle, except the area where a tab was to be formed, cutting a multi-layered polymer film prepared in a manner mentioned above to the size of 3.1 cm×4.5 cm, interposing the above film between the anode and the cathode, and passing it through a roll laminator of 100° C. to laminate each electrodes and the separator layer.

(Stacking Full Cells)

The full cells 17', 17 and 17" were placed as in structure 20 of FIG. 3 in sequence of 17', 17 and 17" with the single-side coated electrodes at the electrode current collector of the outermost side. The multi-layered polymer films were cut to the size of 3.1 cm×4.5 cm and inserted between the adjoining portions of the full cells. Next, they were passed through a roll laminator of 100° C. to laminate the full cells and the polymer films.

(Preparing a Battery)

The prepared full cell stacked battery was placed within the aluminum laminate package. Then the liquid electrolyte comprising 1:2 weight ratio of EC/EMC of 1 M $LiPF_6$ was injected and packaged.

Example 2

Preparing a Stacked Cell where a Bicell is a Basic Unit (Preparing a Cathode)

Each cathode was prepared according to the method same as the above example 1.

A cathode of the bicell that was to be placed in the inner side was prepared by coating the slurry on both sides of aluminum foil. That is, the cathode has a cathodic material coated on both sides of the aluminum cathode current collector. The thickness of the both-side coated cathode was 140 µm.

(Preparing an Anode)

Each anode was prepared according to the method same as the above example 1.

Anodes that were to be placed in the outermost sides of the outermost full cell were prepared by coating the slurry on a single side and on both sides of copper foils. That is, the anodes have an anodic material coated on a single side and on both sides of the copper anode current collector respectively. An anode of the full cell that was to be placed in the inner side was prepared by coating the slurry on both sides of copper anode current collector. In this case, the anode has an anodic material coated on both sides of the copper anode current collector. The thickness of the single-side coated anode was 100 µm and the thickness of the both-side coated anode was 135 µm.

(Preparing a Separator Layer; a Separator Film; a Polymer Film for Polymer Electrolyte)

The separator layers, separator films, and polymer film for polymer electrolyte were prepared in a manner identical to the example 1.

(Preparing a Bicell to be Placed in the Inner Side)

The cathode having aforesaid cathodic material coated on both sides of a cathode current collector was cut to the size of 2.9 cm×4.3 cm of rectangle, except for the area where a tab was to be formed. The anode having an anodic material coated on both sides of an anode current collector was cut to the size of 3.0 cm×4.4 cm of rectangle, except for the area where a tab was to be formed.

The bicell 23 of FIG. 5a was prepared by placing a both-side coated anode in the middle and the both-side coated cathode at both outer sides, cutting a multi-layered polymer film prepared in a manner mentioned above to the size of 3.1 cm×4.5 cm, interposing the above film between the anode and the cathode, and passing it through a roll laminator of 100° C. to laminate each electrodes and the separator layer. Another bicell, that is, the bicell 24 of FIG. 5b was prepared by placing the both-side coated cathode in the middle and the both-side coated anodes at both outer sides, cutting a multi-layered polymer film prepared in a manner mentioned above to the size of 3.1 cm×4.5 cm, interposing the above film between the anode and the cathode, and passing it through a roll laminator of 100° C. to laminate each electrode and the separator layer.

(Preparing a Bicell to be Placed in the Outermost Side)

The full cell 24' of FIG. 7 was prepared by cutting the cathode having cathodic material coated on a single side and both sides of the cathode current collector to the size of 2.9 cm×4.3 cm of rectangle, except for the area where a tab was to be formed, cutting the anode having anodic material coated on both sides of the anode current collector to the size of 3.0 cm×4.4 cm of rectangle, except for the area where a tab was to be formed, placing a single side coated anode, both-side coated cathode and both-side coated anode, cutting a multi-layered polymer film prepared in a manner mentioned above to the size of 3.1 cm×4.5 cm, interposing the above film between each anode and cathode, and passing it through a roll laminator of 100° C. to laminate each electrodes and the separator layer.

(Stacking Bicells)

The bicells 23 and 24' were placed as in structure 26 of FIG. 7 in sequence of 24', 23 and 24' with the single-side coated anode electrode at the anode current collector of the outermost side. The multi-layered polymer films were cut into the size of 3.1 cm×4.5 cm and inserted between the adjoining portions of the bicells. Next, they were passed through a roll laminator of 100° C. to laminate the bicells and the polymer films.

(Preparing a Battery)

The prepared stacked bicell battery was placed within the aluminum laminate package. Then the liquid electrolyte comprising 1:2 of EC/EMC of 1 M $LiPF_6$ was injected and packaged.

The electrochemical element according to the present invention multiply stacked with full cells or bicells as a unit cell is easy to manufacture, has a structure which uses the space available efficiently, and can especially maximize the content of the active electrode material so that a highly integrated battery can be implemented.

What is claimed is:

1. A method for preparing electrochemical element which is stacked with a full cell as a basic unit, comprising:

(a) preparing a full cell placed in the inner side,
   wherein the full cell comprises a cathode coated with cathodic materials on both sides of a cathode current collector, a separator layer and an anode coated with anodic materials on both sides of an anode current collector sequentially;

(b) preparing a full cell placed in the outermost side,
   wherein the full cell comprises (i) a cathode coated with cathodic materials on a single side of a cathode current collector, a separator layer and an anode coated with anodic materials on both sides of an anode current collector sequentially or (ii) an anode coated with anodic materials on a single side of an anode current collector, a separator layer and a cathode coated with cathodic materials on both sides of a cathode current collector sequentially, and
   wherein the outermost side of the full cell is a current collector foil; and (c) laminating at least one full cell placed in the inner side of (a), two full cells placed in the outermost side of (b) and at least two separator films between each full cell.

2. The method for preparing electrochemical element according to claim 1, wherein said separator film of (c) is selected from a group consisting of a mirco-porous polyethlene film, a mirco-porous polypropylene film, or multi-layer film prepared by a combination thereof, and a polymer film for polymer electrolyte.

3. The method for preparing electrochemical element according to claim 2, wherein said polymer film for polymer electrolyte comprises a primary micro-porous polymer layer and a secondary galling polymer layer of polyvinylidene fluoride-chlorotrifluoroethylene copolymer.

4. The method for preparing electrochemical element according to claim 2, wherein said polymer film for polymer electrolyte is selected from a group consisting of polyvinylidene fluoride, polyethylene oxide, polyacrylonitrile, and polyvinylidene fluoride hexafluoropropylene copolymer.

5. A method for preparing electrochemical element which is stacked with a bicell as a basic unit, comprising:

(a) preparing a bicell placed in the inner side,
   wherein the bicell comprises (i) a cathode coated with cathodic materials on both sides of a cathode current collector, a separator layer, an anode coated with anodic materials on both sides of an anode current collector, a separator layer, and a cathode coated with cathodic materials on both sides of a cathode current collector sequentially or (ii) an anode coated with anodic materials on both sides of an anode current collector, a separator layer, a cathode coated with cathodic materials on both sides of a cathode current collector, a separator layer, and an anode coated with anodic materials on both sides of an anode current collector sequentially;

(b) preparing a bicell placed in the outermost side,
   wherein the bicell comprises (i) a cathode coated with cathodic materials on a single side of a cathode current collector, a separator layer, an anode coated with anodic materials on both sides of an anode current collector, a separator layer, and a cathode coated with cathodic materials on both sides of a cathode current collector sequentially or (ii) an anode coated with anodic materials on a single side of an anode current collector, a separator layer, a cathode coated with cathodic materials on both sides of a cathode current collector, a separator layer, and an anode coated with anodic materials on both sides of an anode current collector sequentially, and
   wherein the outermost side of the bicell is a current collector foil; and (c) laminating at least one bicell placed in the inner side of (a), two bicells placed in the outermost side of (b) and at least two separator films between each bicell.

6. The method for preparing electrochemical element according to claim 5, wherein said separator film of (c) is selected from a group consisting of a micro-porous polyethylene film, a micro-porous polypropylene film, or a multi-layer film prepared by a combination thereof, and a polymer film for polymer electrolyte.

7. The method for preparing electrochemical element according to claim 6, wherein said polymer film for polymer electrolyte comprises a primary micro-porous polymer layer and a secondary galling polymer layer of polyvinylidene fluoride-chlorotrifluoroethylene copolymer.

8. The method for preparing electrochemical element according to claim 6, wherein said polymer film for polymer electrolyte is selected from a group consisting of polyvinylidene fluoride, polyethylene oxide, polyacrylonitrile, and polyvinylidene fluoride hexafluoropropylene copolymer.

* * * * *